Sept. 2, 1952     H. M. KNAPP ET AL     2,609,171
SHOCK MOUNT FOR RELAYS
Filed Sept. 1, 1948
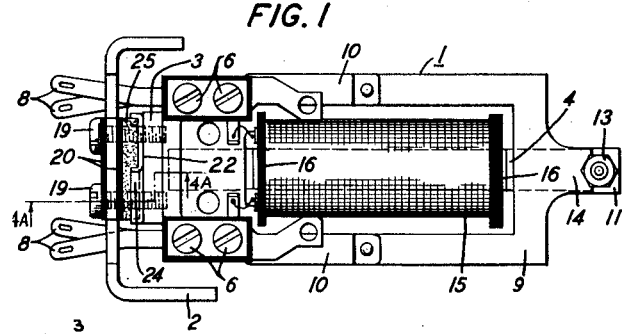
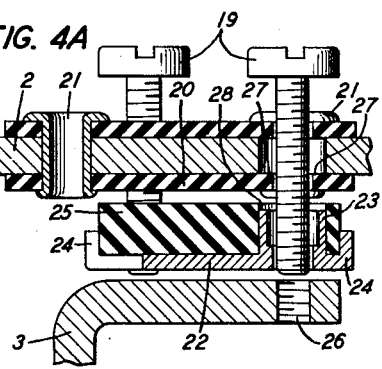
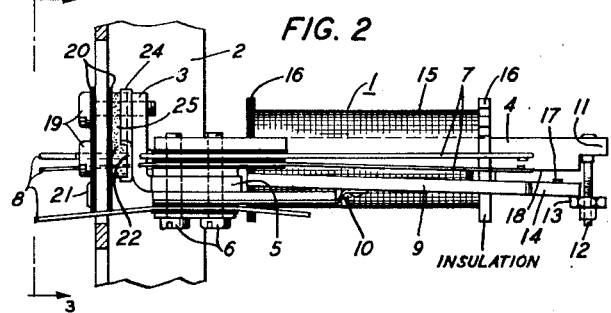
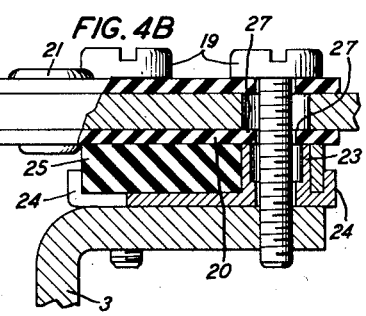
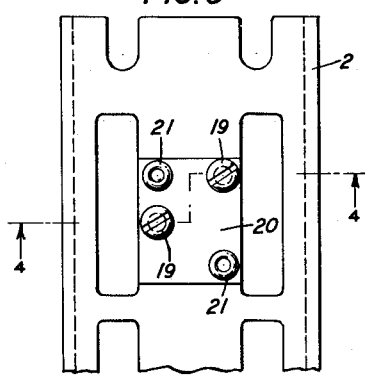
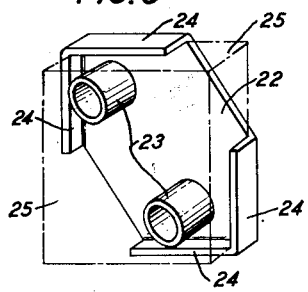
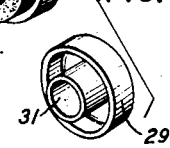
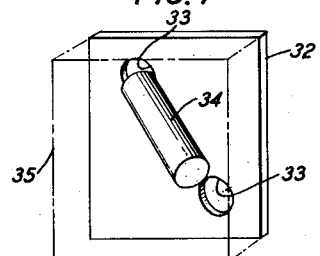
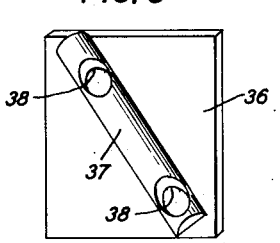
INVENTORS: H. M. KNAPP
F. A. ZUPA
BY
P. C. Smith
ATTORNEY Patented Sept. 2, 1952

2,609,171

UNITED STATES PATENT OFFICE 2,609,171

SHOCK MOUNT FOR RELAYS

Harry M. Knapp, Scotch Plains, N. J., and Frank A. Zupa, New York, N. Y., assignors to Bell Telephone Laboratories, Incorporated, New York, N. Y., a corporation of New York Application September 1, 1948, Serial No. 47,274

7 Claims. (Cl. 248—358)

This invention relates generally to relay mounting means, and more specifically to a structure for mounting a relay such that contact chatter due to shock caused by armature rebound is considerably reduced.

There are known in the prior art many so-called shock and antivibration mountings for electrical apparatus. Solely resilient mounting means have been employed in such forms as coil springs and elastic materials, generally ordinary rubber. Leaf springs have been proposed in such forms as cantilevers and arches, such as commonly used in automobile body suspension. There have been proposed such other mounting means as will enable a device to be mounted either rigidly or resiliently as desired by proper adjustment of such mounting structure.

There are certain advantages derived from the use of the above well-known types of mountings, which, as outlined above, may not be exhaustive of the field. Coil springs, elastic material and leaf springs, etc., have the ability to absorb shock but are subject to rather low resonant frequencies of mechanical vibration and do not produce such a rigid mounting as is necessary for safe shipment and for handling attendant installation and maintenance. Rigid mountings, such as the prior art type, where such as a relay is substantially immovably mounted to a mounting plate by means of mounting screws under tension, do not have the ability to absorb shock because the substantially immovable mounting arrangement acts as a good transmission medium of shock rather than an absorber thereof.

It is the main object of the present invention to improve antishock mountings for relays and the like.

It is a further object of the invention to provide a mounting for electrical apparatus, such as relays, which will be sufficiently rigid as required for transportation, etc., but which also has the ability to absorb shock energy.

It is another object of the invention to provide a rigid mounting for electrical apparatus, such as relays, which mounting is capable of absorbing shock energy originating within the relay or apparatus structure by expending such energy or a substantial part thereof in intentional relative motion between the apparatus structure and its mounting frame.

It is a specific object of the present invention to provide a rigid mounting for electrical apparatus which mounting includes a mechanical pivot means whereby shock energy originating within the apparatus structure can expend itself by pivotal motion of said apparatus structure relative to its mounting frame.

The present invention relates to a mounting arrangement whereby for all practical purposes of shipment and handling the relay or other electrical device mounted thereby has the benefit of a rigid mounting means; whereas, at the same time and without any alterations or adjustments to the mounting means, the relay as a unit has an intentional pronounced freedom of motion relative to the mounting frame such that shock energy originating within the relay structure may be dissipated by relative motion between the relay structure and the mounting framework. Due to its rigidity characteristic, the mounting means does not possess a low resonant frequency of mechanical vibrations which is objectionable in coil spring or elastically suspended devices. In addition, the rigidity feature dose not detract from the ability of the mounting means to absorb shock due to the presence of the freedom of motion which is utilized as a shock absorber or reducer.

More specifically, the invention, as disclosed herein by way of example, comprises a pivot interposed between a relay mounting bracket and the relay mounting frame, and securing means, such as machine screws or other supports under tension securing said bracket to said plate such that the pivot has its axis in line with said securing means, or screws as disclosed herein. The axis of the pivot is disposed at an angle with the direction of motion of the relay armature and presents a pivoting area to the relay bracket or the mounting frame, or both, which may take the form of a knife edge, an element of a cylinder, an element of an embossing, a plurality of reduced contact area pivot members, or others which will be suggested by the present disclosure. Due to the securing means, such as tensioned screws, the relay is rigidly held to its mounting frame such that it can be said to be stiff. Nevertheless since the rigid mounting arrangement includes a pivot in line with aligned securing screws, shock energy created within the relay structure can be expended or absorbed to a substantial degree in pivotal movement of the relay structure at the mounting area relative to the frame.

In view of the foregoing objects and general statement of invention, the following detailed description of the invention is set forth with the aid of the drawing forming a part of this disclosure. General descriptions of the various figures of said drawing are as follows:

Fig. 1 shows a side elevation of a relay mounted by means of the invention;

Fig. 2 shows a top plan view of the relay and mounting arrangement of Fig. 1;

Fig. 3 is an end elevation taken along the direction 3—3 of Fig. 2;

Fig. 4 is a section along the line 4—4 of Fig. 3;

Figs. 4A and 4B are amplified sections along the line 4A—4A of Fig. 1 and rotated 90 degrees clockwise, Fig. 4A representing the condition prior to tightening and Fig. 4B, after tightening; and, Figs. 5, 6, 7 and 8 illustrate, in perspective, various forms of the pivot means forming part of the present invention.

Referring particularly to Figs. 1 and 2, an electromagnetic relay, generally indicated by the reference numeral 1, is mounted on a relay mounting plate 2 by means of the embodiment of the novel structure of the invention shown in Fig. 5. Relay 1, as is well known, comprises such general structure as mounting bracket 3 integral with or secured to a core 4 and integral with the yoke 5 upon which is mounted by means of screws 6, contact springs 7, terminals 8, and rearward armature bearing plate or plates to which armature 9 is secured by means of leaf springs 10. The forward end 11 of core 4 carries a back stop stud 12 with back stop nut 13 threaded thereon, as is well known. The forward end 14 of armature 9 is attractable magnetically to the forward end 11 of core 4 when the coil 15, which is mounted on core 4 between spoolheads 16, is energized. The forward end 14 of armature 9 is released to its normal position, as determined by back stop nut 13, under the retractile forces of the contact springs 7 and leaf spring 10.

The kinetic energy of the moving armature 9 upon operation or release is dissipated somewhat by friction and, in the case of operation, further by the build-up resistance of contact springs 7 and leaf spring 10. Nevertheless armature 9 expends considerable kinetic energy upon impact of the armature operated air-gap stop pin 17 with the pole face 18 of the forward end 11 of core 4. Greater kinetic energy is expended upon impact of the end 14 of armature 9 with the back stop nut 13 upon release of armature 9. A small amount of the releasing kinetic energy of armature 9 is absorbed by distortion of the back stop stud 12 and back stop nut 13; however, the greater part of such energy is expended in shock induced in the core 4 and framework of the relay, as a whole. Such shocks are induced upon both operation and release of armature 9 and the greatest harmful effect of such shocks is to cause rebound of armature 9 which, as is also well known, manifests itself in chatter of contacts, such as 7. The ill effects of the latter need not be cataloged since they are too well known to those skilled in the relay and relay circuit design arts to need introduction.

It is the fundamental purpose of the present invention to help in minimizing the above harmful contact chatter due to such armature rebound. Presently will be described the basis of the present invention which is a novel means for mounting relay 1 upon mounting plate 2 such that relay 1 retains the advantages of a rigid mounting while enabling the shock energy of armature impact against the core 4 and back stop nut 13 to be expended to a considerable extent in relative motion of relay 1 as a unit with reference to mounting plate 2.

The usual manner of securing relay bracket 3 to the mounting plate 2 has been to fasten said bracket 3 firmly against plate 2 by means of mounting screws 19 under tension cooperating with threaded holes in bracket 3. This mounting arrangement provides a rigid mounting but, as an incident thereto, also provides a mounting arrangement which acts as a very good transmission medium of shock energy and permits little, if any, motion of relay 1 relative to plate 2. Thus, shock energy is transmitted through core 4 back to armature 9 to cause the aforementioned armature rebound. Other less desirable types of mountings, such as coil springs, rubber pads, cantilever springs, etc. have been proposed as advantageous from the shock-absorbing standpoint; however, as has been indicated previously, such mountings do not possess sufficient rigidity for safety of the mounted relays, etc., in transit and handling attendant installation.

According to the present invention, relay mounting bracket 3 is secured to mounting plate 2 by means of mounting screws 19 under tension but with the pivotal structure, such as Fig. 5, interposed between the relay bracket 3 and mounting plate 2. The mounting area on mounting plate 2 where relay bracket 3 is secured may be provided on both sides of mounting plate 2 with insulation 20 secured to mounting plate 2 by means of rivets 21, as is well known construction. However, such plates 20 are not necessary for the practice of the present invention. Fig. 3 shows most clearly that the mounting screws 19 are arranged at an angle, approximating 45 degrees, with the direction of motion of armature 9, which is horizontal in Fig. 3.

The mounting structure of Fig. 5 comprises a plate 22 having arranged diagonally thereon integral extruded eyelets 23, which as shown in Figs. 4, 4A and 4B extend above certain ribs 24. The ribs 24 may be provided for rigidity and as a means for confining excessive lateral spreading of a rubber pad 25, which may be employed if desired, as will be explained.

With particular reference to Figs 4A and 4B, just prior to securing relay bracket 3 to mounting plate 2, as shown in Fig. 4A, the structure of Fig. 5 is located so that it is between the bracket 3 and the plate 2 and so that the eyelets 23 are aligned with mounting screws 19. It is optional whether the eyelets 23 abut against the plate 2 or against the bracket 3. The disclosed method of mounting the structure of Fig. 5 is exemplary only, since the aforementioned optional method will be obvious. When mounting screws 19 are tightened by cooperation with threaded holes 26 in bracket 3, the completed assembly is shown in Fig. 4B. The eyelets 23 are forced against the insulator strip 20 and with screws 19 comprise the sole rigid support for relay 1. The eyelets 23 may be arranged to press upon the overhanging rim 27 of insulator strip 20 or may be arranged to press upon a portion of insulator strip 20 which is supported. The former will afford more freedom of motion of eyelets 23 due to the ability of insulator strip 23 to distort slightly without shearing or crushing. The latter, of course, will preclude any shearing of the overhanging rim 27 of insulator strip 20.

It is found, with the above construction of the mounting means for relay 1, that shock energy produced within the framework or structure of relay 1 will be expended to a considerable extent in a pivotal motion of bracket 3 (which in effect means motion of relay 1 as a unit) relative to mounting plate 2 about the eyelets 23 as pivots. These eyelets 23 comprise fairly closely fitting cylindrical bushings surrounding screws 19 and, due to the tension produced in said screws 19, said bushing eyelets 23 are held in axial compression between bracket 3 and plate 2. This mounting is, of course, not immovable but it is rigid and stiff and meets all of the requirements of rigidity necessary for safe transit and handling. Nevertheless, due to the novel construction of the mounting structure and its manner of assembly, this rigid mounting possesses the ability to absorb shocks due to armature rebound to such an extent as to reduce the aforementioned undesirable contact chatter to a substantial degree.

As an optional assembly, a pad 25 of rubber or other elastic material may be inserted between the plate 22 of Fig. 5 and the surface of the mounting plate 2. The use of such a pad 25 adds somewhat to the shock absorbing ability of the mounting means as a whole but is not necessary for practical advantageous use of the invention. The rubber pad 25 will be required to have clearance holes 28 therein for accommodating screws 19 and eyelets 23, as shown at 28 in Fig. 4A. If such a rubber pad 25 is to be employed it is found that for the first time in a mounting arrangement using a rubber pad 25 that it is not necessary to compress said rubber pad 25 beyond its useful shock absorbing limit. Previously, when such a pad 25 has been used alone, it has been necessary, in order to produce a satisfactory rigid mounting, to compress the rubber pad 25 so far that its useful shock absorbing limit had been passed. With the present invention, as most clearly shown in Fig. 4A, the rubber pad 25 may be slightly thicker than the height of eyelets 23 such that, as shown in Fig. 4B, when the mounting is assembled, the rubber pad 25 is compressed only partially. It therefore retains almost its full range of shock absorbing movement either in compression or tension. It will be noted from an inspection of Fig. 5, in particular, that ribs 24 on plate 22 do not extend completely around the perimeter of plate 22. Two corners are left free of ribs 24 in order to afford the rubber pad 25 a greater freedom of motion than if laterally confined on all sides by ribs 24.

Figs. 6, 7 and 8 illustrate other forms of the mounting structure which may be substituted readily for that of Fig. 5, described above in detail.

Fig. 6 comprises two structurally separate cup-shaped cylindrical bushing members 29 adapted to confine rubber washers 30 if desired. These bushings 29 are constructed to fit closely about mounting screws 19 with the smaller cylindrical portions 31 pressing against the insulator plate 20 on mounting plate 2 or against the relay bracket 3 as desired.

Fig. 7 illustrates a flat plate 32, which may or may not be provided with ribs such as ribs 24 of Fig. 5, having clearance holes 33 therein to accommodate mounting screws 19 and having welded or otherwise secured thereto in line with holes 33 a cylindrical rod 34. A rubber pad 35 may be used with the structure of Fig. 7 as well as pad 25 with Fig. 5. As will be appreciated such a pad 35 would be required to have clearance holes for mounting screws 19 and a clearance slot for rod 34. Again the rod 34 may press against the mounting plate 2, with or without insulator strips 20, or against the relay bracket 3 or, for that matter, could be welded to either of the mounting plate 2 or bracket 3 without necessitating the presence of plate 32.

Fig. 8 illustrates a plate 36 having thereon an embossing 37 with clearance holes 38 through the plate 36 and through the embossing 37 for accommodating mounting screws 19. A rubber pad may also be used with this structure and, as will be appreciated from prior discussion of other species, may press against mounting plate 2, with or without insulator plates 20, or against bracket 3, or may be secured to either without the necessity of a plate 36.

The species shown in Figs. 7 and 8 have advantages over the species of Figs. 5 and 6 which amount primarily to simplicity of construction and additional freedom of pivotal action. Other modifications of the basic concept will be suggested to those skilled in the art. Such modifications might comprise knife edge pivots, point pivots, ball pivots and other forms of cylindrical surface pivots.

The disclosures described herein by way of examples of the invention are not to be construed as limitations on the scope of the present invention. Claims are appended which alone define such scope.

What is claimed is:

1. A relay mounting arrangement comprising a mounting plate, a relay, a mounting bracket attached to said relay, a plurality of supports substantially parallel to each other in substantially the same plane, said supports under tension rigidly securing said bracket to said plate, and a member interposed in compression between said plate and said bracket, said member having a plurality of points on its surface lying substantially in the same straight line substantially in said plane and substantially perpendicular to said supports and comprising substantially the sole contact area between said member and at least one of the pair consisting of said plate and said bracket, said supports and said member comprising the sole rigid support between said plate and said bracket.

2. A relay mounting arrangement comprising a mounting plate, a relay, a mounting bracket attached to said relay, a plurality of supports substantially parallel to each other in substantially the same plane, said supports under tension rigidly securing said bracket to said plate, and a member interposed in compression between said plate and said bracket, said member having a straight line element on its surface lying substantially in said plane and being substantially perpendicular to said supports and comprising substantially the sole contact area between said member and at least one of the pair consisting of said plate and said bracket, said supports and said member comprising the sole rigid support between said plate and said bracket.

3. A relay mounting arrangement comprising a mounting plate, a relay, a mounting bracket attached to said relay, a plurality of supports substantially parallel to each other in substantially the same plane, said supports under tension rigidly securing said bracket to said plate, and a member interposed in compression between said plate and said bracket, said member having a cylindrical surface at least one element thereof lying substantially in said plane and substantially perpendicular to said supports and comprising substantially the sole contact area between said member and at least one of the pair consisting of said plate and said bracket, said supports and said member comprising the sole rigid support between said plate and said bracket.

4. A relay mounting arrangement comprising a mounting plate, a relay, a mounting bracket attached to said relay, a plurality of supports substantially parallel to each other in substantially the same plane, said supports under tension rigidly securing said bracket to said plate and a member interposed in compression between said plate and said bracket, said member having a circular cylindrical surface at least one element thereof lying substantially in said plane and substantially perpendicular to said supports and comprising substantially the sole contact area between said member and at least one of the pair consisting of said plate and said bracket, said supports and said member comprising the sole rigid support between said plate and said bracket.

5. A relay mounting arrangement comprising a mounting plate, a relay, a mounting bracket attached to said relay, a plurality of supports substantially parallel to each other in substantially the same plane, said supports under tension rigidly securing said bracket to said plate, and a solid circular rod interposed in diametral compression between said plate and said bracket along substantially diametrically opposite elements of the surface of said circular rod, at least one of said elements lying substantially in said plane and substantially perpendicular to said supports and comprising substantially the sole contact area between said circular rod and at least one of the pair consisting of said plate and said bracket, said supports and said circular rod comprising the sole rigid support between said plate and said bracket.

6. A relay mounting arrangement comprising a mounting plate, a relay, a mounting bracket attached to said relay, a plurality of supports substantially parallel to each other in substantially the same plane, said supports under tension rigidly securing said bracket to said mounting plate, an additional plate interposed between said mounting plate and said bracket, and a solid circular rod secured to said additional plate along an element of the surface of said circular rod, said circular rod interposed in diametral compression between said additional plate and one of the pair consisting of said mounting plate and said bracket along substantially diametrically opposite elements of the surface of said circular rod, one of said elements lying substantially in said plane and substantially perpendicular to said supports and comprising substantially the sole contact area between said circular rod and at least one of the pair consisting of said mounting plate and said bracket, said supports and said circular rod comprising the sole rigid support between said mounting plate and said bracket.

7. A relay mounting arrangement comprising a mounting plate, a relay, a mounting bracket attached to said relay, two substantially parallel screws under tension rigidly securing said bracket to said mounting plate, an additional plate interposed between said mounting plate and said bracket, and a solid circular rod secured to said additional plate along an element of the surface of said rod, said rod interposed in diametral compression between said additional plate and one of the pair consisting of said mounting plate and said bracket along substantially diametrically opposite elements of the surface of said rod, one of said elements lying substantially in the plane including said screws and substantially perpendicular to said screws and comprising substantially the sole contact area between said circular rod and at least one of the pair consisting of said mounting plate and said bracket, said screws and said rod comprising the sole rigid support between said mounting plate and said bracket.

HARRY M. KNAPP.
FRANK A. ZUPA.

REFERENCES CITED

The following references are of record in the file of this patent:

UNITED STATES PATENTS

| Number | Name | Date |
|---|---|---|
| 2,249,871 | Taigman | July 22, 1941 |

FOREIGN PATENTS

| Number | Country | Date |
|---|---|---|
| 118,058 | Switzerland | Dec. 22, 1924 |